US006189863B1

(12) United States Patent
Blackburn

(10) Patent No.: US 6,189,863 B1
(45) **Date of Patent: *Feb. 20, 2001**

(54) FLOOR JACK

(75) Inventor: John H. Blackburn, Greenville, SC (US)

(73) Assignee: Sunex International, Inc., Greenville, SC (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/002,640

(22) Filed: Jan. 5, 1998

Related U.S. Application Data

(60) Provisional application No. 60/044,051, filed on Apr. 17, 1997.

(51) Int. Cl.[7] .......... B60P 1/48

(52) U.S. Cl. .......... 254/8 B; 254/133 R; 254/131; 254/2 B; 254/93 H

(58) Field of Search .......... 254/8 B, 3 B, 254/7 B, 2 B, 93 H, 133 R, 131, 134; 403/348, 378

(56) References Cited

U.S. PATENT DOCUMENTS

| | | | |
|---|---|---|---|
| D. 253,696 | 12/1979 | Suzuki . | |
| D. 272,670 | 2/1984 | Tsujimura . | |
| D. 285,855 | 9/1986 | Persson . | |
| D. 296,598 | 7/1988 | Hung . | |
| D. 358,923 | 5/1995 | Hawkins . | |
| 1,563,001 * | 11/1925 | Weaver | 254/2 B |
| 2,029,022 * | 1/1936 | Graham | 254/133 R |
| 3,534,640 * | 10/1970 | Macy | 403/378 |
| 4,018,421 | 4/1977 | Tallman . | |
| 4,131,263 | 12/1978 | John . | |
| 4,212,559 * | 7/1980 | Persson | 403/348 |
| 4,241,900 | 12/1980 | Okuda . | |
| 4,513,950 | 4/1985 | Yamagishi . | |
| 4,596,378 * | 6/1986 | Liang et al. | 254/8 B |
| 4,635,902 * | 1/1987 | Chou | 254/8 B |
| 5,201,494 | 4/1993 | Lundman . | |
| 5,261,641 * | 11/1993 | Ployer | 254/88 |

* cited by examiner

*Primary Examiner*—David A. Scherbel
*Assistant Examiner*—Lee Wilson
(74) *Attorney, Agent, or Firm*—Dority & Manning, P.A.

(57) ABSTRACT

A portable hydraulic floor jack has a saddle member with an axial stem that is provided with an end collar having a flattened side surface. This permits the saddle member to be rotated to a singular orientation in which the flattened side surface of the end collar can bypass a locking pin that is permanently installed transversely of the receiving opening for the stem of the saddle member.

14 Claims, 4 Drawing Sheets

FLOOR JACK

This regular application is based on provisional application Ser. No. 60/044,051, filed Apr. 17, 1997.

BACKGROUND OF THE INVENTION

The present invention relates to floor jacks and more particularly to portable hydraulic floor jacks.

Conventional hydraulic floor jacks such as shown in FIGS. 1 and 2 are known. In the embodiment shown in FIG. 1, the saddle member, which is generally indicated by the numeral 10, includes a rest plate 11 and a stem 12. The jack has a lifting base 13 that receives stem 12 in an opening 14 formed in base 13. In this embodiment, saddle 10 is easily removed from and installed into opening 14 of lifting base 13 of the jack, but cannot be locked into opening 14.

In the conventional floor jack shown in FIG. 2 for example, a saddle 10' has a collar 15' formed at the free end of a stem 12'. An axially extending opening 14' is formed in a lifting base 13'. The axis of cylindrical symmetry of stem 12' and opening 14' is denoted in FIG. 2 by the numeral 17'. When saddle 10' is inserted with collar 15' and stem 12' into axial opening 14' formed in lifting base 13', a locking pin 16' is inserted into a hole that extends transversely through opening 14'. The axis of cylindrical symmetry of the hole that receives the locking cylindrical symmetry of the hole that receives the locking pin 16', extends along a chord of the circle that defines the transverse shape of the opening 14' and thus is offset from the diameter of opening 14'. This relative orientation allows the locking pin 16' to become disposed between collar 15' and the bottom surface of rest plate 11'. Then, locking pin 16' is permanently attached in this position so as to prevent separation of saddle 10' from the floor jack shown in FIG. 2. Locking pin 16' blocks collar 15' from axial movement out of opening 14''. In order to assure that saddle 10' remains locked in the jack, locking pin 16' is in essence permanently installed in the hole that transversely intersects opening 14'. The axis of cylindrical symmetry of locking pin 16' is denoted in FIG. 2 by the numeral 18 and is disposed transversely with respect to axis 17.

It would be desirable for a floor jack to be provided with a saddle that was easily removable as saddle 10 shown in FIG. 1, yet securely held in place as saddle 10' shown in FIG. 2.

OBJECTS AND SUMMARY OF THE INVENTION

It is a principal object of the present invention to provide a floor jack wherein the saddle can be locked into the lifting base, yet is configured so as to be easily removable without requiring disassembly of other components of the jack.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a portable floor jack has a lifting base provided with an axially disposed receiving opening. The jack further includes a saddle member having an axially extending stem. The axial stem of the saddle member of the floor jack is provided with an end collar having a flattened side surface.

This permits the saddle member to be rotated to a singular orientation in which the flattened side surface of the end collar can bypass a locking pin that is permanently installed transversely of the receiving opening for the stem of the saddle member.

The accompanying drawings, which are incorporated in and constitute a part of this specification, illustrate one embodiment of the invention and, together with the description, serve to explain the principles of the invention.

DETAILED DESCRIPTION OF THE PREFERRED EMBODIMENTS

Reference now will be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The same numerals are assigned to the same components throughout the drawings and description.

Figure 1:
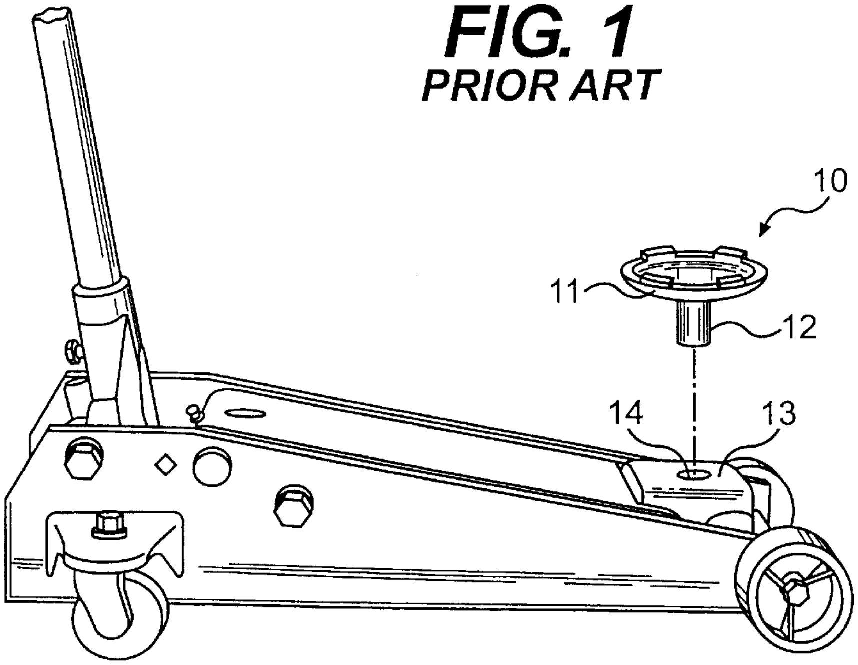
FIG. 1 PRIOR ART
FIG. 1 is an elevated perspective view of a prior art device.
Figure 2:
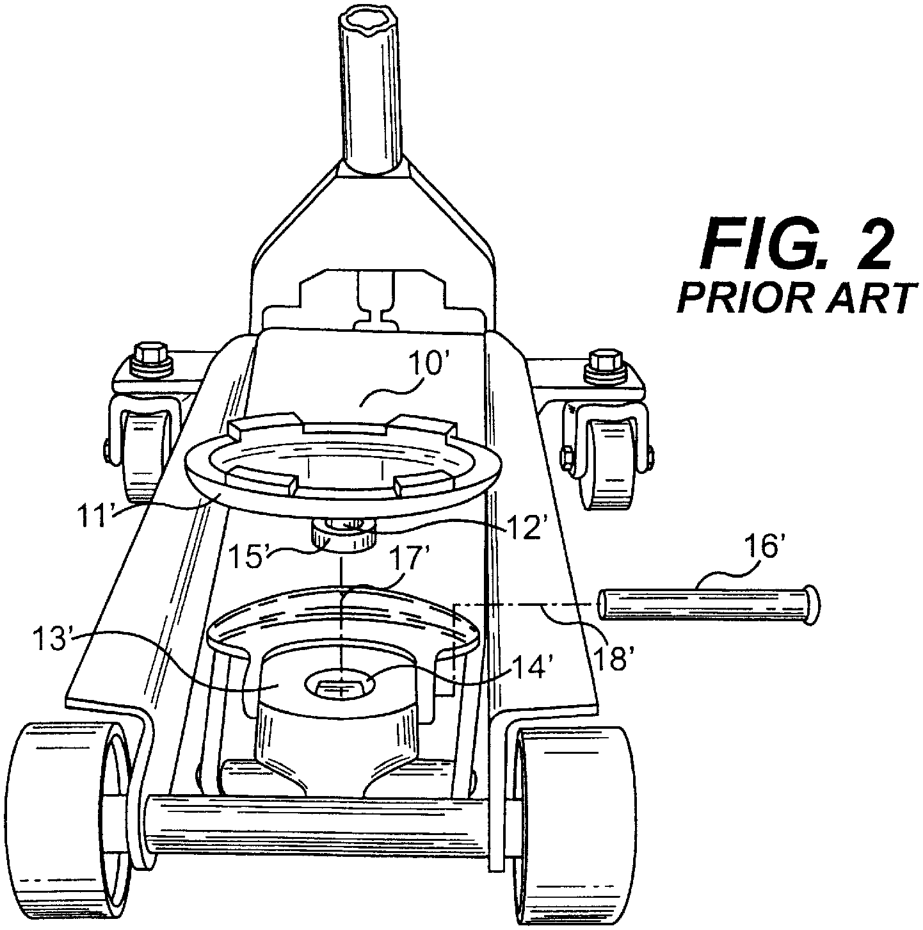
FIG. 2 PRIOR ART
FIG. 2 is an elevated perspective view of another prior art device.

The jack of the present invention can be portable or stationary. Moreover, the components other than those described more particularly below, can be conventional, such as in the jacks shown in FIGS. 1 and 2 for example.

Figure 3:
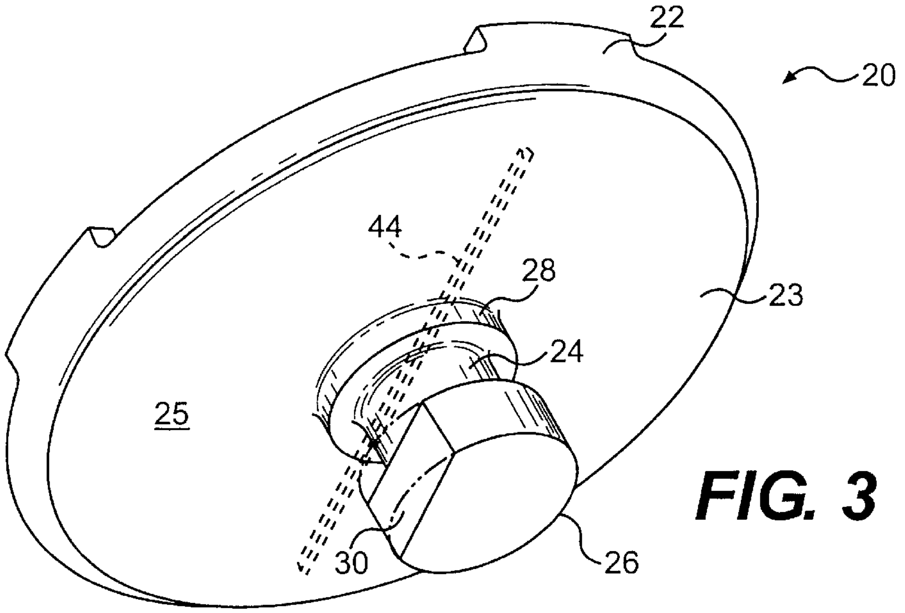
FIG. 3 is a bottom perspective view of a preferred embodiment of components of the present invention.
Figure 6A:
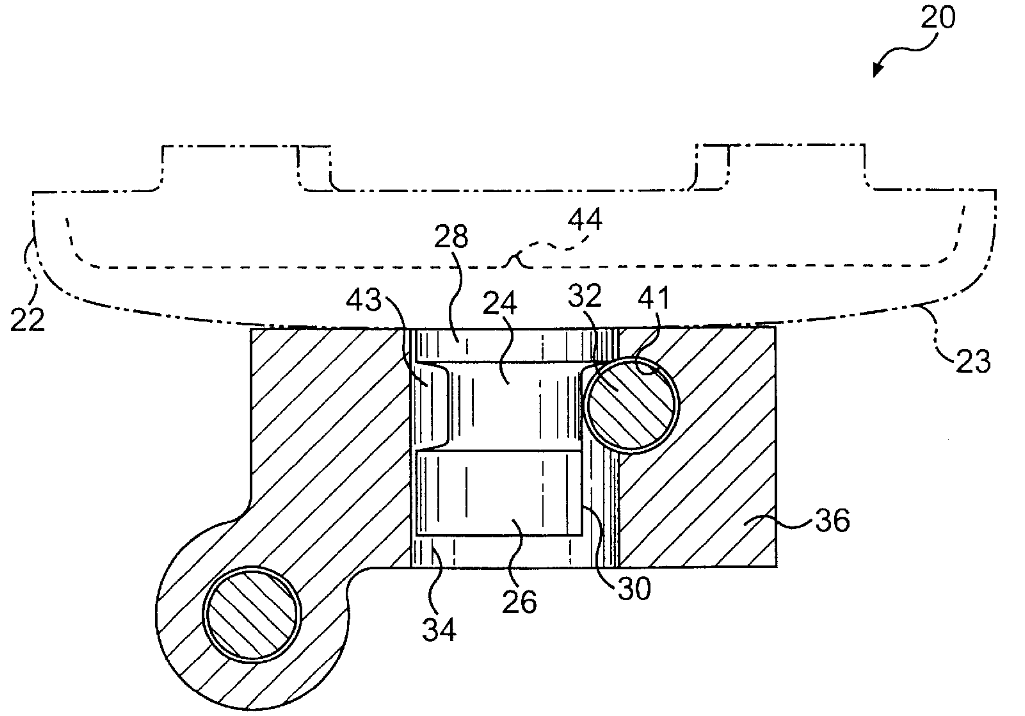
FIG. 6A is a view that is partially in cross-section, partially in side plan and includes elements shown in phantom by the dashed lines and chain dashed lines and is taken from the point of view looking in the direction of arrows 6A—6A in FIG. 4.
Figure 6B:
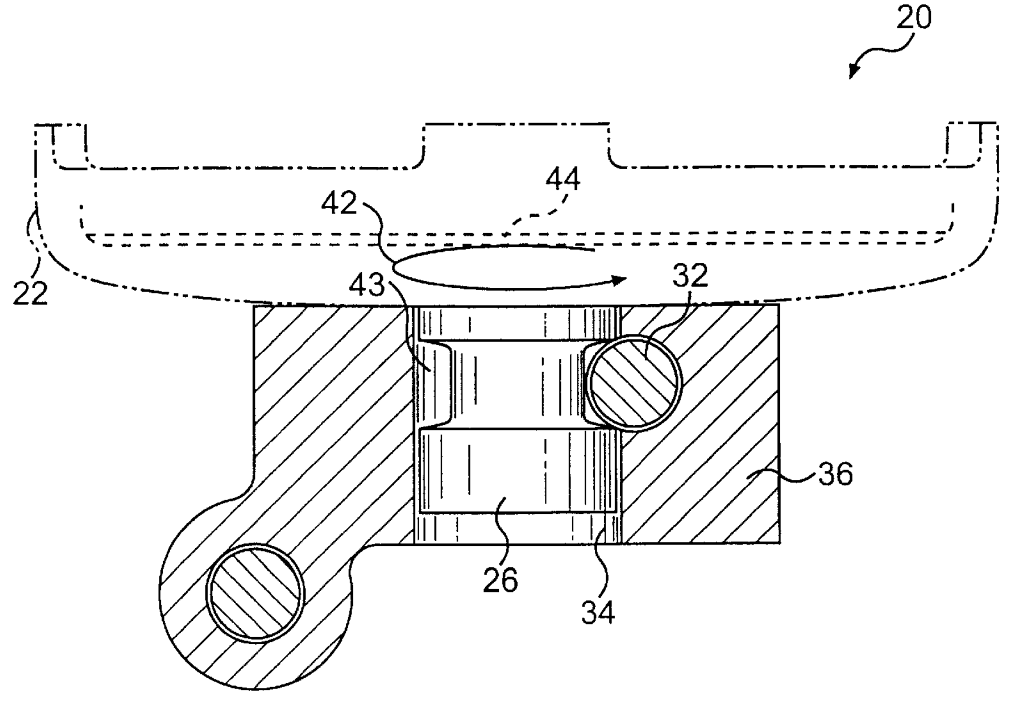
FIG. 6B is a view that is partially in cross-section, partially in side plan and includes elements shown in phantom by the dashed lines and chain dashed lines and is taken from the point of view looking in the direction of arrows 6B—6B in FIG. 4.

In a presently preferred embodiment of the jack according to the present invention, there is a lifting accessory. The lifting accessory can take various forms. One form of the lifting accessory is a saddle member. A transmission adaptor (not shown) would be another such lifting accessory. As shown in FIGS. 3, 6A and 6B the jack includes a lifting accessory such as a saddle member, which is indicated generally by the designating numeral 20.

As shown in FIG. 3 for example, saddle member 20 includes a lifting plate member 22 and a stem member 24. Lifting plate member 22 is configured in the form of a generally radially extending member 23. Stem member 24 extends generally normally and centrally from plate member 23 and elongates along a cylindrical axis of symmetry that is generally normal to plate 23. At one extreme free end of stem 24, there is formed an end collar member 26 having a diameter generally larger than the diameter of stem member 24. A base collar 28 can be connected to and extend from the bottom surface 25 of plate 23. End collar 26 cooperates with stem 24 and base collar 28, which is axially spaced apart from end collar member 26 along stem 24, to form a groove that extends circumferentially around stem 24. Base collar 28 can be part of a unitary structure that includes plate member 23, end collar 26 and stem 24.

In accordance with the present invention, the end collar is formed as disc with a circular cross-section having a portion removed so as to form a flat planar face on a side surface of the end collar. As shown in FIG. 3 for example, the parallel arced dashed lines define the portion of the end collar that is machined away to form a flat side face 30 on end collar 26.

Figure 4:
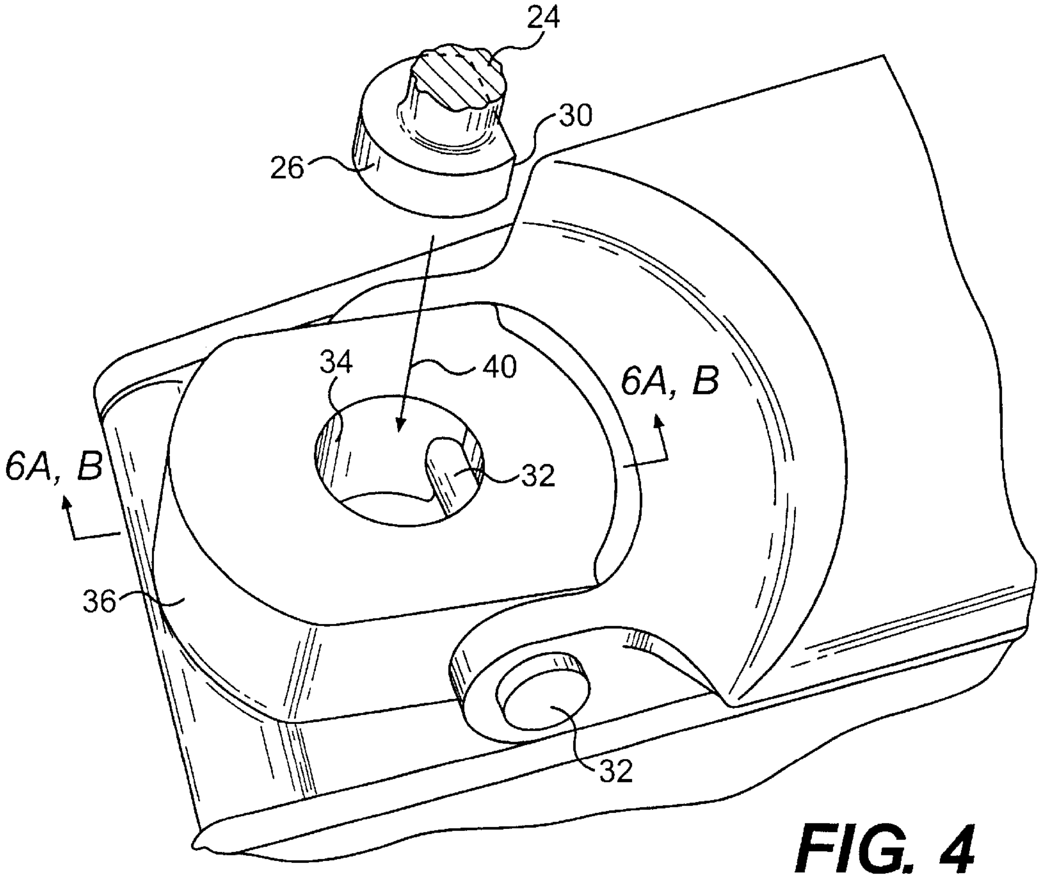
FIG. 4 is a top perspective view of a preferred embodiment of components of the present invention.

In further accordance with the present invention, as shown in FIGS. 4, 5A, 5B, 6A, and 6B, a locking pin 32 is permanently installed so as to intrude into the axial opening 34 formed in lifting base 36 of the jack of the present invention. As shown in FIG. 4 for example, the axis of cylindrical symmetry of stem 24 and end collar 26 is indicated by the arrow designated by the numeral 40. As shown in FIG. 4, the axis of cylindrical symmetry of locking pin 32 is disposed transversely with respect to axis 40. As shown in FIG. 6A for example, a hole 41 is formed to extend transversely through lifting base 36 and intersecting axial opening 34 in a manner similar to the way a chord would intersect a circle. Locking pin 32 is received within hole 41 and can be permanently installed therein.

As shown in FIGS. 6A and 6B, an annular space 43 is defined within opening 34. Annular space 43 is defined by stem 24, end collar 26, base collar 28, and a section of the walls that define opening 34. As shown in FIGS. 6A and 6B, a section of locking pin 32 occupies a portion of that annular space 43 as locking pin extends across opening 34.

Figure 5A:
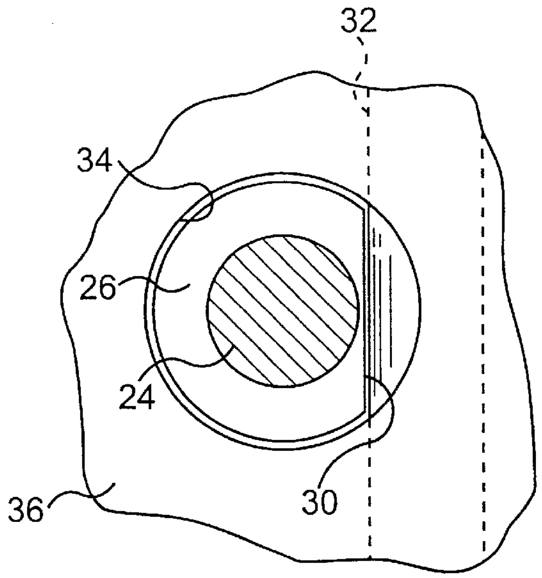
FIG. 5A is a top plan view of a preferred embodiment of components of the present invention oriented for installation and removal of the saddle member from the jack.
Figure 5B:
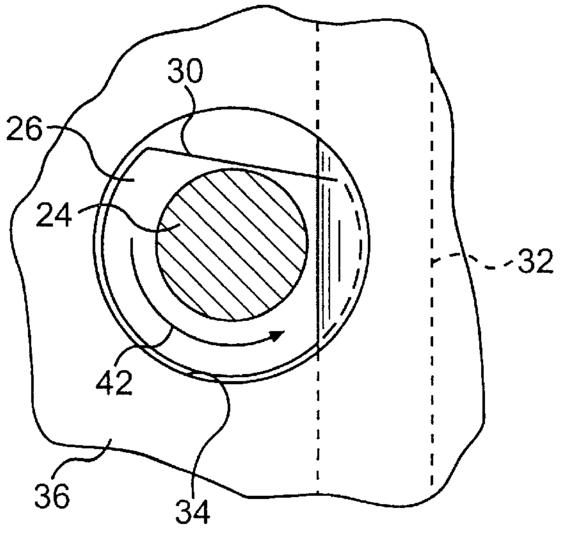
FIG. 5B is a top plan view of components of the present invention oriented in a configuration wherein the saddle member is locked into the lifting base of the jack.

In operation, to install saddle member 20 into the jack, saddle member 20 is oriented so that flat face 30 will bypass locking pin 32 as flattened end collar 26 is lowered axially into opening 34 formed axially into lifting base 36. This configuration also is shown in FIGS. 5A and 6A. In FIG. 6A, saddle member 20 (indicated by chain dashed lines) is installed in lifting base 36. In order to lock saddle member 20 to the jack, saddle member 20 is rotated within opening 34 in the direction of circular arrows 42 shown in FIGS. 5D and 6B. In this way, flattened end collar 26 interferes with locking pin 32 and so prevents saddle member 20 from being disconnected from lifting base 36 of the jack. However, saddle member 20 can be removed by orienting flat face 30 so as to bypass locking pin 32 when saddle member 20 is being pulled away from lifting base 36.

In a further preferred embodiment of the present invention, an indexing ridge 44, which is indicated in phantom by the dashed line in FIGS. 3, 6A and 6B, can be configured to run parallel to the plane of flat face 30 of flattened end collar 26. This permits the operator to visually locate the approximate position of flat face 30. Once the operator has oriented ridge 44 and aligned same relative to locking pin 32, the operator can proceed to finally position flat face 30 relative to locking pin 32 for disconnecting saddle member 20 from the jack. This can be done by means of the operator's tactile sensation. The operator gently pulls saddle member 20 upwardly away from lifting base 36, until flat face 30 is exactly positioned so as to be able to bypass locking pin 30. Then the operator can withdraw stem 24 and flattened end collar 26 from within opening 34 of lifting base 36 and remove saddle member 20 from the jack. Indexing ridge 44 is similarly useful when installing saddle member 20 into opening 34 of the jack.

While a preferred embodiment of the invention has been described using specific terms, such description is for illustrative purposes only, and it is to be understood that changes and variations may be made without departing from the spirit or scope of the following claims. For example, another lifting accessory can be substituted for the saddle member if it is desired to be mounted to the lifting plate of the jack. This other lifting accessory can be similarly provided with an appropriately configured flattened end collar to facilitate locking and unlocking same with respect to the lifting base of the jack. Moreover, the jack can be hydraulic or otherwise powered with the lifting force. For example, the lifting force can be provided by an electric powered motor.

What is claimed is:

1. A jack, comprising:

a lifting base provided with an axially disposed receiving opening;

a lifting accessory having an axially extending stem defining a first diameter;

an end collar connected to one end of said axial stem of said lifting accessory and defining a first portion having a second diameter that is larger than said first diameter of said stem of said lifting accessory, said end collar being received in said receiving opening, said end collar defining a flattened side surface forming a second portion with a diameter smaller than said second diameter;

a locking pin installed in said lifting accessory and extending transversely through an edge of said receiving opening;

wherein said end collar is configured and disposed to permit said lifting accessory to be selectively rotated clockwise between a first orientation in which said flattened side surface of said end collar can bypass said locking pin during axial movement of said lifting accessory relative to said lifting base and a second orientation in which said lifting accessory is prevented from axial movement relative to said base due to said first portion of said end collar being prevented from bypassing said locking pin and said end collar is configured and disposed to permit said lifting accessory to be selectively rotated counterclockwise between a first orientation in which said flattened side surface of said end collar can bypass said locking pin during axial movement of said lifting accessory relative to said lifting base and a third orientation in which said lifting accessory is prevented from axial movement relative to said base due to said first portion of said end collar being prevented from bypassing said locking pin.

2. A jack as in claim 1, further comprising:

an indexing ridge defined in said lifting accessory and configured to run parallel to the plane of said flattened side surface of said end collar.

3. A jack, as in claim 1, further comprising:

a hole formed to extend transversely into said lifting base and intersecting said receiving opening; and wherein said locking pin is installed in said hole.

4. A jack as in claim 3, wherein said locking pin is permanently installed in said hole.

5. A jack as in claim 1, wherein said lifting accessory is configured as a saddle member defining a lifting plate member connected to said stem.

6. A jack as in claim 1, wherein said stem has a circular circumference defining said first diameter.

7. A jack as in claim 1, wherein said receiving opening is defined by a cylindrical wall, said wall, said stem and said end collar cooperate to define an annular space, and said locking pin occupies a portion of said annular space.

8. A jack, comprising:

a lifting base provided with an axially disposed receiving opening;

a lifting accessory having an axially extending stem defining a first diameter;

an end collar connected to one end of said axial stem of said lifting accessory and defining a first portion having a second diameter that is larger than said first diameter of said stem of said lifting accessory, said end collar being received in said receiving opening said end collar defining a flattened side surface forming a second portion with a diameter smaller than said second diameter;

a locking pin installed in said lifting accessory transversely of said receiving opening;

wherein said end collar is configured and disposed to permit said lifting accessory to be selectively rotated between a first orientation in which said flattened side surface of said end collar can bypass said locking pin during axial movement of said lifting accessory relative to said lifting base and a second orientation in which said lifting accessory is prevented from axial movement relative to said base due to said first portion of said end collar being prevented from bypassing said locking pin; and wherein said stem and said end collar of said lifting accessory are configured for 360 degrees of axial rotation within said receiving opening when received in said receiving opening.

9. A jack as in claim 8, further comprising:

an indexing ridge defined in said lifting accessory and configured to run parallel to the plane of said flattened side surface of said end collar.

10. A jack, as in claim 8, further comprising:

a hole formed to extend transversely into said lifting base and intersecting said receiving opening; and wherein said locking pin is installed in said hole.

11. A jack as in claim 10, wherein said locking pin is permanently installed in said hole.

12. A jack as in claim 8, wherein said lifting accessory is configured as a saddle member defining a lifting plate member connected to said stem.

13. A jack as in claim 8, wherein said stem has a circular circumference defining said first diameter.

14. A jack as in claim 8, wherein said receiving opening is defined by a cylindrical wall, said wall, said stem and said end collar cooperate to define an annular space, and said locking pin occupies a portion of said annular space.

* * * * *